United States Patent
Pu et al.

(10) Patent No.: US 8,459,156 B2
(45) Date of Patent: Jun. 11, 2013

(54) TAILSTOCK DEVICE FOR A LATHE

(75) Inventors: Hank Pu, Taichung (TW); Tzu-Wen Hung, Taichung (TW)

(73) Assignee: Yi-Da Precision Machiney Co., Ltd. (TW)

( * ) Notice: Subject to any disclaimer, the term of this patent is extended or adjusted under 35 U.S.C. 154(b) by 379 days.

(21) Appl. No.: 13/009,079

(22) Filed: Jan. 19, 2011

(65) Prior Publication Data

US 2011/0283846 A1    Nov. 24, 2011

(30) Foreign Application Priority Data

May 21, 2010  (TW) ................................ 99116327 A

(51) Int. Cl.
*B23B 23/00* (2006.01)
(52) U.S. Cl.
USPC .............................................. 82/148; 82/129
(58) Field of Classification Search
USPC .................................................... 82/148, 129
See application file for complete search history.

(56) References Cited

U.S. PATENT DOCUMENTS

| | | | | |
|---|---|---|---|---|
| 3,691,879 A | * | 9/1972 | Blake | 82/127 |
| 3,821,835 A | * | 7/1974 | St. Andre et al. | 29/36 |
| 4,597,155 A | * | 7/1986 | Garnett et al. | 29/564 |
| 5,239,901 A | * | 8/1993 | Lin | 82/119 |
| 5,964,016 A | * | 10/1999 | Ito et al. | 29/27 C |
| 8,172,234 B2 | * | 5/2012 | Bernhardt | 279/5 |

FOREIGN PATENT DOCUMENTS

| | | |
|---|---|---|
| CN | 1562561 | 1/2005 |
| DE | 19826518 A1 * | 12/1999 |
| TW | 203791 | 4/1993 |

OTHER PUBLICATIONS

Search Report by Taiwanese Intellectual Property Office for Taiwanese patent application No. 099116327 referenced in office action dated Nov. 16, 2012.

* cited by examiner

*Primary Examiner* — Daniel Howell
*Assistant Examiner* — Nicole N Ramos
(74) *Attorney, Agent, or Firm* — Trop Pruner & Hu, P.C.

(57) ABSTRACT

A tailstock device for a lathe includes a carrier defining an accommodation space for accommodating a hub mount. The hub mount is turnable relative to the carrier and has two angularly displaced stage posts extending radially and outwardly for mounting first and second holders, respectively. By turning of the hub mount, a selected one of the holders is moved to a working position to aligned with a longitudinal axis of a workpiece held thereby. The tailstock device can hold a variety of workpieces, and allow adjustment of the angle and position of a workpiece held thereby.

7 Claims, 7 Drawing Sheets

TAILSTOCK DEVICE FOR A LATHE

CROSS-REFERENCE TO RELATED APPLICATION

This application claims priority of Taiwanese Patent Application No. 099116327, filed on May 21, 2010, the disclosure of which is herein incorporated by reference.

BACKGROUND OF THE INVENTION

1. Field of the Invention

This invention relates to a tailstock device for a lathe, more particularly to a tailstock device which has a rotary hub mount for mounting two holders that are used to selectively hold a workpiece.

2. Description of the Related Art

Referring to FIG. 1, a conventional machine lathe is shown to include a tailstock 12 which is driven by a servomotor 13 to slide on a lathe bed 11 in a longitudinal direction (X) relative to a spindle and to clamp and center a free end of a workpiece (not shown). While the tailstock is disposed to apply a holding force along the longitudinal direction (X) to a workpiece, the tailstock 12 is merely suitable for a workpiece that is elongated in shape or of small diameter. Additionally, the angle and position of a workpiece to be worked are not adjustable, so that the machine lathe provided with the tailstock 12 can not be adapted to perform complicated sequential motions.

SUMMARY OF THE INVENTION

An object of the present invention is to provide a tailstock device which can hold a variety of workpieces and which allows adjustment of the angle and positions of a workpiece held thereby.

According to this invention, the tailstock device includes a mounting base adapted to be slidable on a lathe bed in a longitudinal direction, front and rear mounting posts disposed on the mounting base, spaced apart from each other in a transverse direction by an accommodation space, and respectively having front and rear bearing walls that surround a rotary axis oriented in the transverse direction, a rotary shaft having front and rear journal segments which are respectively journalled on the front and rear bearing walls, and a middle segment disposed in the accommodation space, a hub mount mounted to turn with the middle segment of the rotary shaft, and first and second stage posts extending from the hub mount radially and outwardly to terminate at first and second stage end portions which are angularly displaced from each other about the rotary axis. First and second holders respectively define first and second lengthwise axes, and are respectively disposed on the first and second stage end portions such that, when a selected one of the first and second stage end portions is displaced to a working position, a corresponding one of the first and second lengthwise axes is brought in alignment with a longitudinal axis along that a workpiece is held. A drive transmitting unit is coupled with the rotary shaft to turn the rotary shaft to thereby displace the selected one of the first and second stage end portions to the working position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 2:
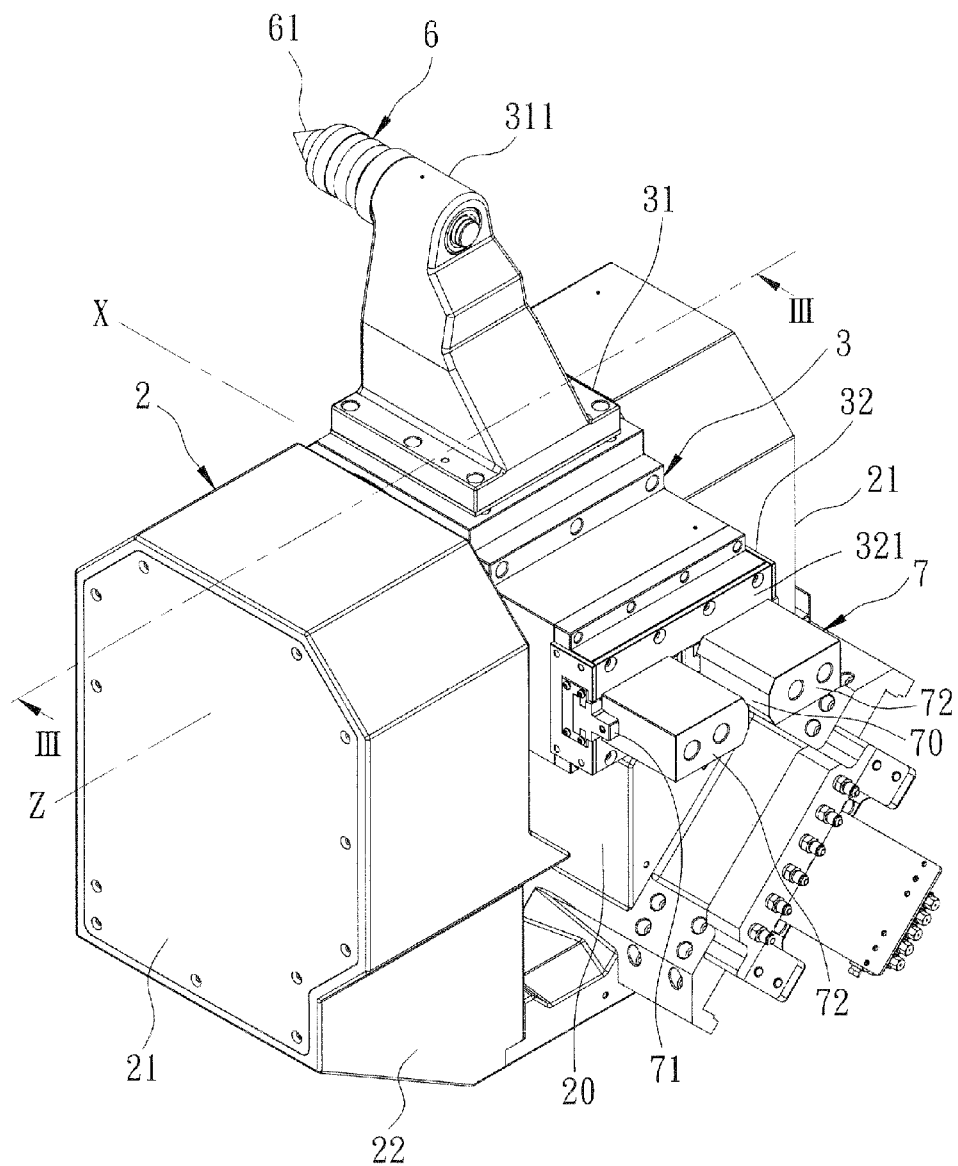
FIG. 2 is a perspective view of the preferred embodiment of a tailstock according to this invention.
Figure 3:
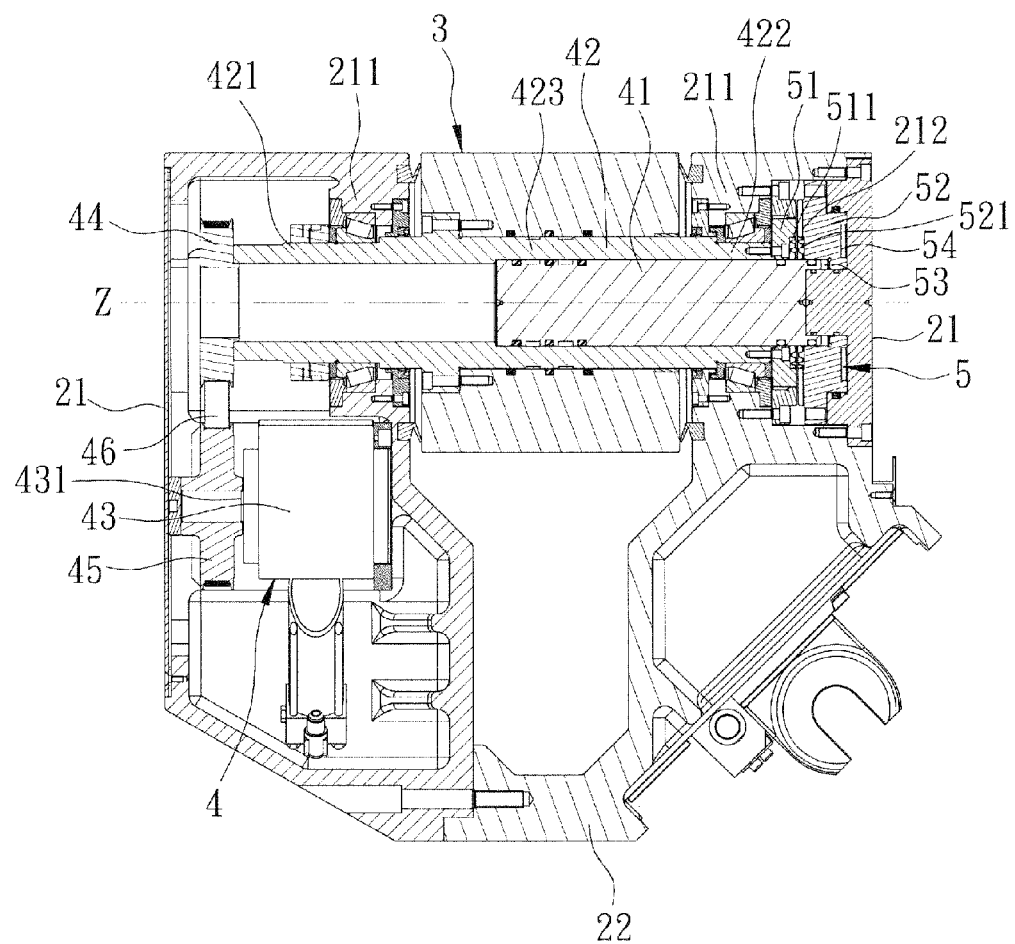
FIG. 3 is a sectional view of the preferred embodiment.
Figure 4:
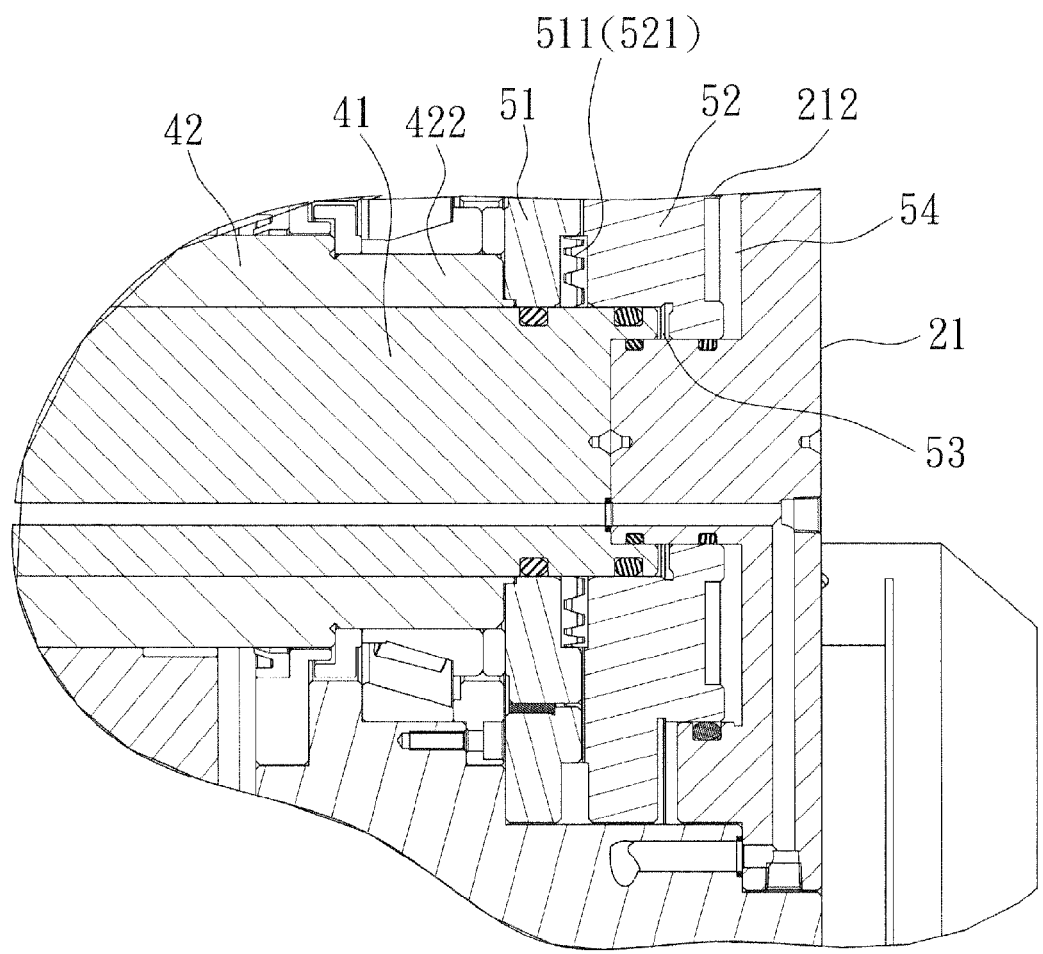
FIG. 4 is an enlarged sectional view of a portion of the preferred embodiment.

Referring to FIGS. 2 to 4, the preferred embodiment of a tailstock device according to the present invention is shown to comprise a carrier 2, a rotary shaft 42, a hub mount 3, first and second holders 6, 7, a drive transmitting unit 4, and a locking unit 5.

Figure 1:
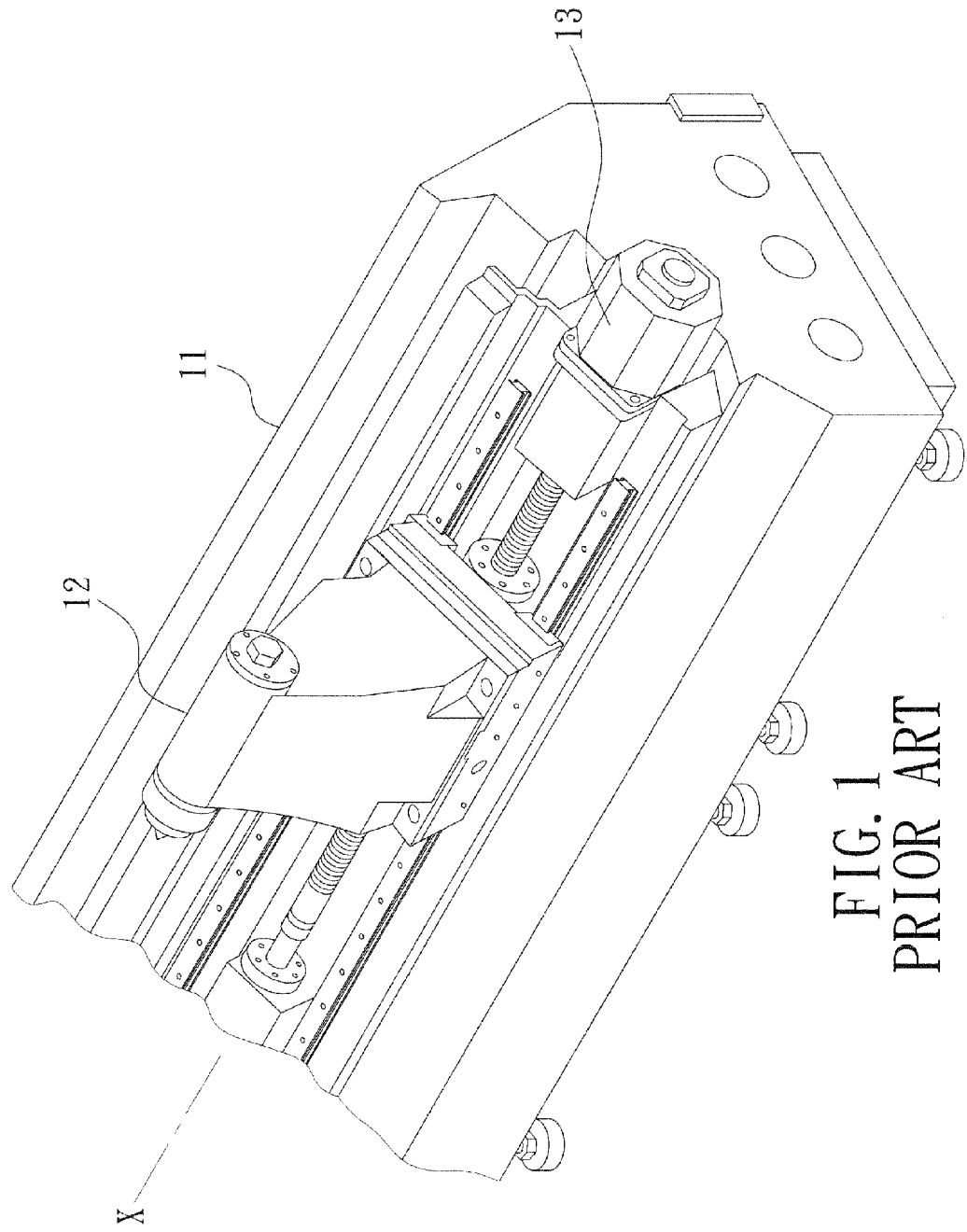
FIG. 1 is a perspective view of a conventional tailstock of a lathe.

The carrier 2 includes a mounting base 22 adapted to be slidable on a lathe bed 11 of a lathe (see FIG. 1) in a longitudinal direction (X), and front and rear mounting posts 21 which are disposed on the mounting base 22, and which are spaced apart from each other in a transverse direction relative to the longitudinal direction (X) by an accommodation space 20. The front and rear mounting posts 21 respectively have front and rear bearing walls 211 surrounding a rotary axis (Z) oriented in the transverse direction. The rear mounting post 21 has an inner cavity 212.

The rotary shaft 42 is tubular, and has front and rear journal segments 421, 422 which are respectively journalled on the front and rear bearing walls 211 to be turnable about the rotary axis (Z), and a middle segment 423 disposed in the accommodation space 20.

The hub mount 3 is disposed in the accommodation space 20, and is secured to turned with the middle segment 423 of the rotary shaft 42. First and second stage posts 31, 32 extend from the hub mount 3 radially and outwardly to terminate at first and second stage end portions 311,321 which are angularly displaced from each other about the rotary axis (Z) In this embodiment, the first and second stage end portions 311,321 are angularly displaced from each other by about 90 degrees ($\theta 1$).

The first and second holders 6, 7 are respectively disposed on the first and second stage end portions 311,321. In this embodiment, the first holder 6 includes a lathe center 61 which has a pointed end configured to be oriented in a first lengthwise axis. The second holder 7 is a chuck, and includes two jaws 72 spaced apart from each other by a clamping gap 70 that extends along a second lengthwise axis. The width of the clamping gap 70 is adjustable by movement of the jaws 72 along a slide rail 71 extending in the transverse direction. Accordingly, when a selected one of the first and second stage end portions 311,321 is displaced to a working position, a corresponding one of the first and second lengthwise axes is brought in alignment with a longitudinal axis along that a workpiece is held by a corresponding one of the first and second holders 6, 7.

The drive transmitting unit 4 includes an axle 4T is securely disposed on the front and rear mounting posts 21 to support the rotary shaft 42 to be rotatable along the rotary axis (Z), a rotary hydraulic cylinder 43 which has a force transmitting shaft 431 extending in the transverse direction, and a pulley-and-belt transmitting assembly having pulleys 44, 45 and a belt 46 which are disposed to couple the force transmitting shaft 431 to the front journal segment 421 of the rotary shaft 42 so as to transmit a torque of the force transmitting shaft 431 to turn the rotary shaft 42.

Figure 5:
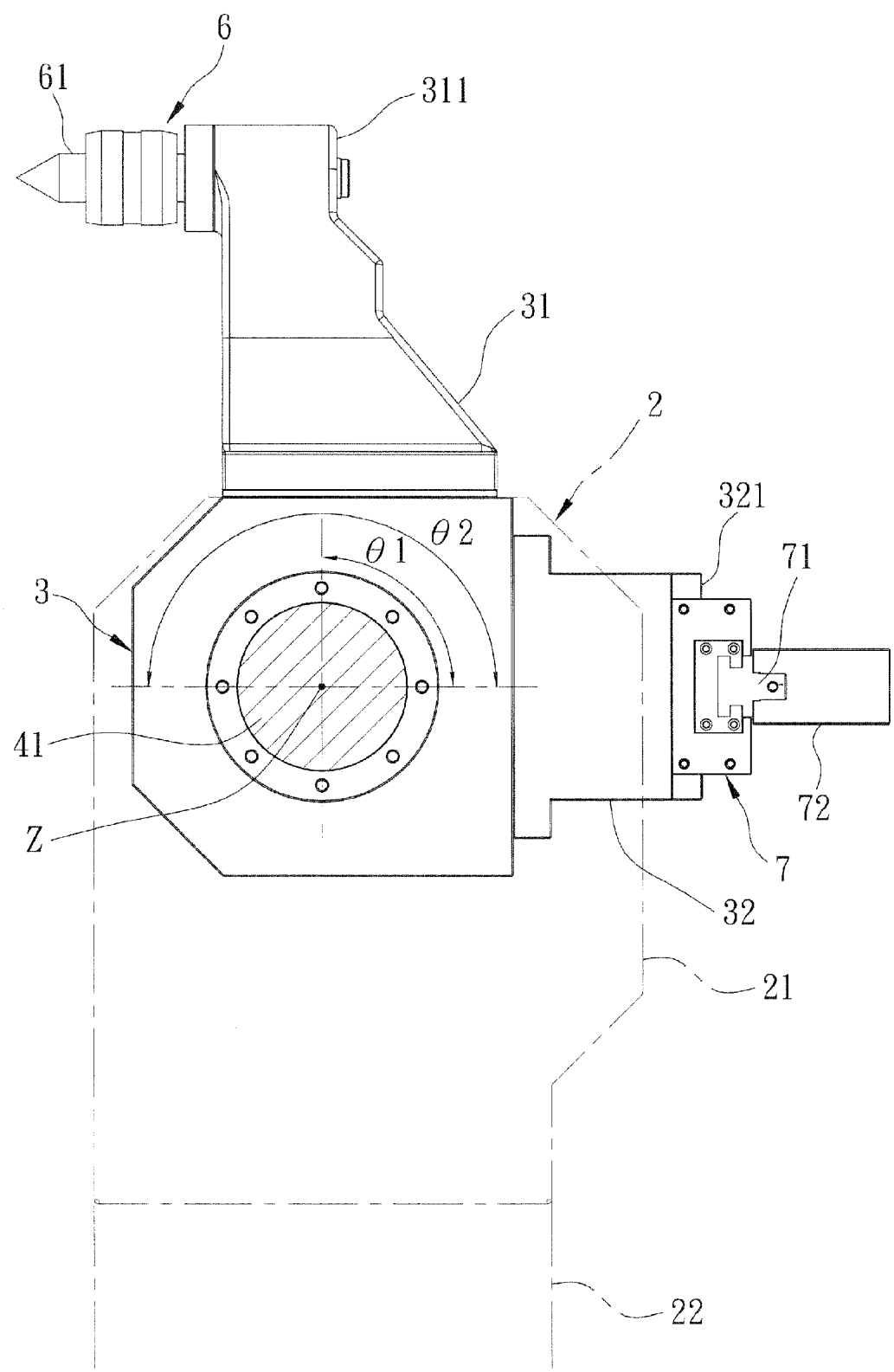
FIGS. 5, 6 and 7 are front views of the preferred embodiment when a rotary hub mount is in three different positions.
Figure 6:
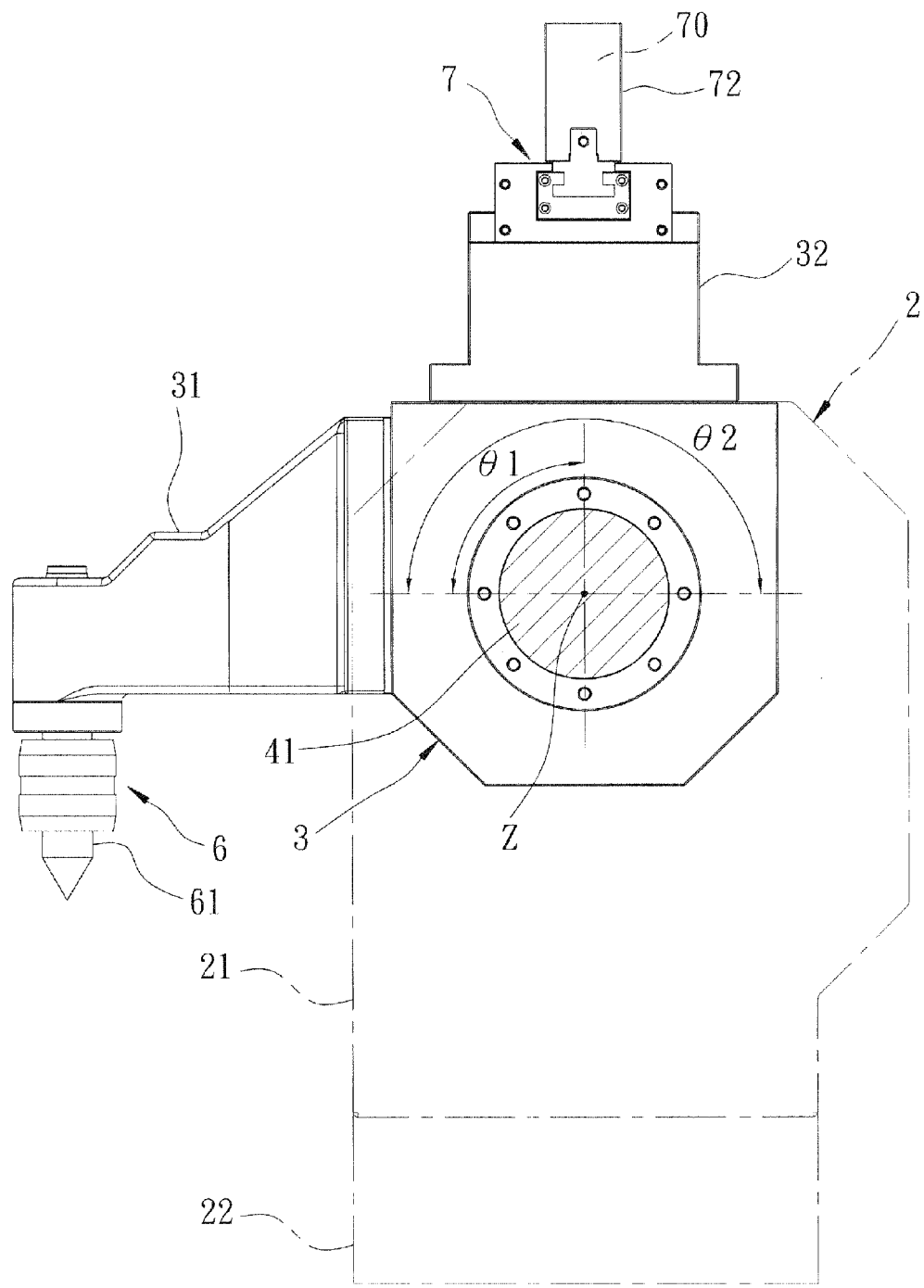
Figure 7:
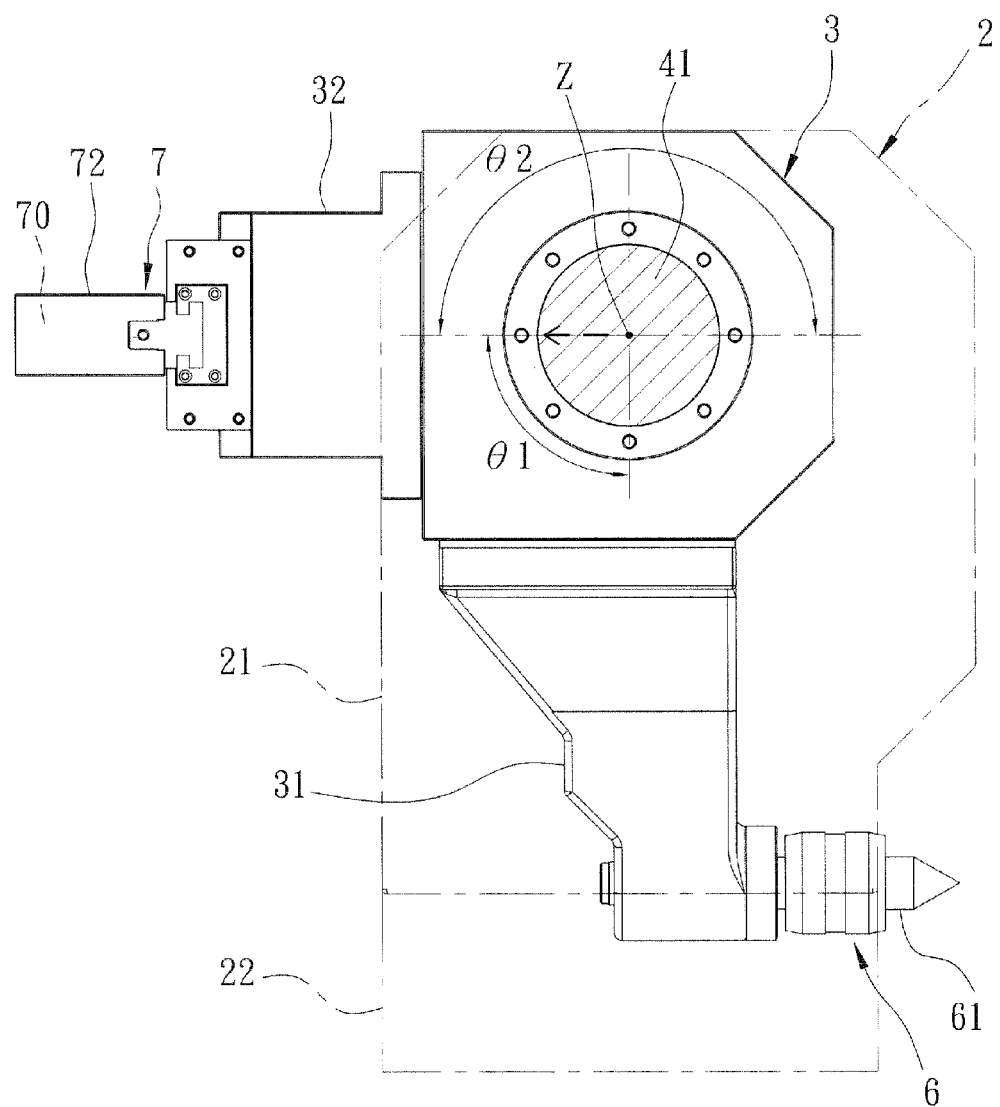

The locking unit 5 includes a locked member 51 secured to the rear journal segment 422 of the rotary shaft 42, and having a rearwardly facing toothed surface 511 which confronts the inner cavity 212, and a locking member 52 fitted in the inner cavity 212, having a forwardly facing toothed surface 521, and axially and fluid-tightly movable relative to the inner cavity 212 between a locking position, as shown in FIG. 4, where the forwardly facing toothed surface 521 is engaged with the rearwardly facing toothed surface 511 to thereby arrest the rotary shaft 42 in the working position, and an unlocking position, as shown in FIG. 3, where the forwardly facing toothed surface 521 is disengaged from the rearwardly facing toothed surface 511. The locking member 52 is hydraulically actuated to move relative to the inner cavity 212 between the locking and unlocking positions. In particular, as shown in FIG. 4, first and second oil ducts 53,54 are defined in the inner cavity 212 such that, when oil is introduced in the first oil duct 53, the locking member 52 is moved by the oil pressure away from the locked member 51 to the unlocking position, At this stage, the hub mount 3 is permitted to be turned about the rotary axis (Z) within a limited range (62), such as from 45 degrees to 360 degrees, and 180 degrees in this embodiment. When oil is introduced in the second oil duct 54, the locking member 52 is moved by the oil pressure to the locking position so as to engage the locked member 51, thereby arresting the hub mount 3 in the working position. For example, as shown in FIG. 5, when the hub mount 3 is arrested in a first working position, the pointed end of the lathe center 61 is oriented in the longitudinal axis for appropriately holding an elongated and thin workpiece (not shown). As shown in FIG. 6, when the hub mount 3 is arrested in a second working position, the second holder 7 stands uprightly, and the adjustable clamping gap 70 between the jaws 72 is aligned with the longitudinal axis for appropriately holding a workpiece (not shown) of irregular shape. Moreover, when the hub mount 3 is turned from the second working position to a third working position, as shown in FIG. 7, the second holder 7 is oriented along a direction of the longitudinal axis, and the adjustable clamping gap 70 is disposed to permit another surface of the workpiece to be worked.

As illustrated, by means of turning of the hub mount 3, a selected one of the first and second holders 6, 7 can be displaced to hold a variety of workpieces, and a workpiece can be worked at different angles and positions. Thus, the tailstock device according to this invention may be provided in a CNC lathe for performing complicated sequential motions.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A tailstock device used in a lathe for holding a workpiece along a longitudinal axis, the lathe having a lathe bed extending in a longitudinal direction, said tailstock device comprising:
   a mounting base adapted to be slidable on the lathe bed in the longitudinal direction;
   front and rear mounting posts which are disposed on said mounting base, and which are spaced apart from each other in a transverse direction relative to the longitudinal direction by an accommodation space, said front and rear mounting posts respectively having front and rear bearing walls surrounding a rotary axis oriented in the transverse direction;
   a rotary shaft having front and rear journal segments which are respectively journalled on said front and rear bearing walls to be turnable about the rotary axis, and a middle segment which is disposed in said accommodation space;
   a hub mount mounted to turn with said middle segment of said rotary shaft;
   first and second stage posts extending from said hub mount radially and outwardly to terminate at first and second stage end portions which are angularly displaced from each other about the rotary axis;
   first and second holders which respectively define first and second lengthwise axes, and which are respectively disposed on said first and second stage end portions, said first and second holders being configured such that, when a selected one of said first and second stage end portions is displaced to a working position, a corresponding one of the first and second lengthwise axes is brought in alignment with the longitudinal axis; and
   a drive transmitting unit coupled with said rotary shaft to turn said rotary shaft about the rotary axis to thereby displace the selected one of said first and second stage end portions to the working position.

2. The tailstock device according to claim 1, wherein said first holder includes a lathe center which has a pointed end configured to be oriented in the first lengthwise axis, and said second holder includes two jaws which are spaced apart from each other by a clamping gap that extends along the second lengthwise axis, and the width of that is adjustable.

3. The tailstock device according to claim 1, wherein said first and second stage end portions are angularly displaced from each other by about 90 degrees.

4. The tailstock device according to claim 1, further comprising a locking unit disposed to arrest said rotary shaft in the working position.

5. The tailstock device according to claim 4, wherein said rear mounting post has an inner cavity, and said locking unit includes
   a locked member secured to said rear journal segment of said rotary shaft, and having a rearwardly facing toothed surface which confronts said inner cavity, and
   a locking member fitted in said inner cavity, having a forwardly facing toothed surface, and axially and fluid-tightly movable relative to said inner cavity between a locking position, where said forwardly facing toothed surface is engaged with said rearwardly facing toothed surface, and an unlocking position, where said forwardly facing toothed surface is disengaged from said rearwardly facing toothed surface.

6. The tailstock device according to claim 5, wherein said locking member is hydraulically actuated to move relative to said inner cavity between the locking and unlocking positions.

7. The tailstock device according to claim 5, wherein said drive transmitting unit includes an axle which is securely disposed on said front and rear mounting posts to support said rotary shaft to be rotatable along the rotary axis, a rotary hydraulic cylinder which has a force transmitting shaft extending in the transverse direction, and a pulley-and-belt transmitting assembly which is disposed to couple said force transmitting shaft to said front journal segment so as to transmit a torque of said force transmitting shaft to turn said rotary shaft.

* * * * *